US008260653B1

(12) United States Patent
Osterfelt et al.

(10) Patent No.: US 8,260,653 B1
(45) Date of Patent: Sep. 4, 2012

(54) COMPUTER-IMPLEMENTED CHANGE RISK ASSESSMENT

(75) Inventors: Susan Osterfelt, Charlotte, NC (US);
Steven Lappert, Towsend, DE (US);
Christopher S. Jones, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 432 days.

(21) Appl. No.: 12/508,230

(22) Filed: Jul. 23, 2009

(51) Int. Cl.
*G06Q 10/00* (2012.01)
(52) U.S. Cl. ................................ 705/7.28; 705/7.36
(58) Field of Classification Search ............. 705/7.28, 705/7.36
See application file for complete search history.

(56) References Cited

U.S. PATENT DOCUMENTS

| | | | |
|---|---|---|---|
| 7,006,992 B1 | 2/2006 | Packwood | |
| 7,305,351 B1* | 12/2007 | Bechhofer et al. | 705/7.28 |
| 7,467,045 B2* | 12/2008 | Tabanou et al. | 702/13 |
| 7,593,859 B1* | 9/2009 | Owens et al. | 705/7.28 |
| 7,664,664 B2* | 2/2010 | King et al. | 705/7.28 |
| 7,698,148 B2* | 4/2010 | Lavu et al. | 705/1.1 |
| 8,050,993 B2* | 11/2011 | Del Bianco et al. | 705/35 |
| 8,069,065 B2* | 11/2011 | Nesgos | 705/4 |
| 2003/0055695 A1* | 3/2003 | Mori et al. | 705/7 |
| 2003/0229525 A1 | 12/2003 | Callahan et al. | |
| 2004/0193467 A1* | 9/2004 | Williams et al. | 705/8 |
| 2004/0260703 A1* | 12/2004 | Elkins et al. | 707/100 |
| 2005/0060213 A1* | 3/2005 | Lavu et al. | 705/7 |
| 2005/0096950 A1* | 5/2005 | Caplan et al. | 705/7 |
| 2005/0177260 A1* | 8/2005 | Schweizerhof et al. | 700/97 |
| 2008/0015889 A1* | 1/2008 | Fenster | 705/1 |
| 2008/0300888 A1* | 12/2008 | Dell'Anno et al. | 705/1 |
| 2008/0312983 A1* | 12/2008 | Chakka | 705/7 |
| 2009/0024425 A1* | 1/2009 | Calvert | 705/7 |
| 2009/0299804 A1* | 12/2009 | Owens et al. | 705/8 |
| 2010/0153156 A1* | 6/2010 | Guinta et al. | 705/8 |
| 2011/0168391 A1* | 7/2011 | Saleri et al. | 166/250.15 |

OTHER PUBLICATIONS

Portfolio risk assessment: A tool for dam safety risk management [PDF] from psu.edu DS Bowles, LR Anderson, TF Glover . . . —Proceedings of USCOLD . . . , 1998—Citeseer.*
Modified FMEA Using Analysis of Automotive Remanufacturer Waste Streams to Support design for Remanufacture [PDF] from utoronto.caM Sherwood . . . —Design Engineering Technical . . . , 2000—mie.utoronto.ca.*
"Project Risk Management using the Project Risk FMEA", Carbone, Thomas a; Tippett, Donald D., Dec. 2004, Engineering Management Journal, vol. 16. No. 4 pp. 28-35.* Donath, Bob; "ISBM Nuggets: New Product Development Consortium—Portfolio Management", Mar. 19, 2001, ISBM New Product Development Consortium, Philadelphia, Pa, pp. 1-54.*

* cited by examiner

*Primary Examiner* — Jonathan G Sterrett
(74) *Attorney, Agent, or Firm* — Michael A. Springs; Moore & Van Allen PLLC; James C. Edwards

(57) ABSTRACT

A change risk assessment system is disclosed. A question-and-answer approach is used to generate a risk assessment that can be broken down by various business categories. Scoring in example embodiments generates a risk level for each identified that takes into account high severity and low detectability characteristics of specific risks associated with a change or new project. The highest average risk priority number (RPN) from any category can be used to facilitate cross-project comparison of risk and reward balance. A risk level can be calculated for both an inherent risk, and a residual risk. The residual risk is calculated taking a mitigation plan into account. A color indication can be displayed for each identified risk, where the color indication is indicative of the risk level. The scoring for an identified risk can also be made to programmatically prompt escalation of the identified issue.

13 Claims, 8 Drawing Sheets

| General | P&L/Metrics | Define | Analyze | Control |
|---|---|---|---|---|
| Credit | Market | Strategic | Customer Experience | Reputation | Legal | Compliance |

Define phase complete ☑ — 420

8 Financial: The risk for significant impact on revenue, expense, or reserve.

8.1 Are there any significant financial risks associated with this change, including an reserve risk. If yes, address risk and mitigation. Please attach the business case.

| | Risk | S | P | D | RPN | Risk Rating |
|---|---|---|---|---|---|---|
| 1 | This initiative could suppress up to $650MM in cash volume in 2009 ▲▼ | 5 | 5 | 2 | 50 | Red |

412

Add Row
418

FIG. 4A

| FIG. 4A | FIG. 4B |

COMPUTER-IMPLEMENTED CHANGE RISK ASSESSMENT

BACKGROUND

Today, many businesses must deal with complex operational models which present many varied types of operational risks. In addition to the normal business risks, increasing privacy related regulations and ethics rules must be complied with by businesses. It can be particularly important to evaluate risks posed by making changes to the operations of a business enterprise. There is an increasing need for comprehensive governance process to assure operational risk associated with changes and new projects and programs is managed appropriately.

Failure mode and effects analysis is a procedure for analysis of potential failure modes within a system for the classification by severity or determination of the failure's effect upon the system. Failure mode and effects analysis is used in the manufacturing industries in various phases of the product life cycle. Failure mode and effects analysis is also used in government and the military. It characterizes failures according to their impact on mission success and personnel, but has a process focus that typically cannot identify business risks such as market and strategic risks that potentially occur when a product or service change occurs.

SUMMARY

Embodiments of the present invention use a question-and-answer approach to automatically generate a risk assessment that can be broken down by various business categories, for example, but not limited to strategic, customer experience, reputation, legal, compliance, financial, people, process, technology, and external risk. Scoring in example embodiments takes into account high severity and low detectability characteristics of specific risks associated with a change or new project.

In some embodiments, determining a level of risk in undertaking a project to implement a change includes collecting, at a workstation, a plurality of responses to questions, each question being related to a category of risk associated with the project. A processor is used to calculate a risk priority number (RPN) and a risk level for each identified risk. The risk level is determined in such a way that the risk level reflects whether the identified risk exhibits a combination of high severity and low detectability. RPNs can be aggregated by the processor into a plurality of categories and an average RPN for each of the plurality of categories can be calculated. The highest average RPN from any category can be stored and used to facilitate cross-project comparison of a risk and reward balance.

In some embodiments, an RPN and a risk level are calculated for both an inherent risk (risk before mitigation plans or controls are taken into account), and a residual risk. The residual risk is calculated taking a mitigation plan for the risk into account. In some embodiments, financial metrics can be collected, and the highest average RPN for any category in a project can be plotted against at least one financial metric to facilitate cross-project comparison of risk versus reward. A determination can also be made as to whether the project as a whole is a high-risk project and a high-risk analysis can be prompted in such a case.

In some embodiments, a color indication can be displayed for each identified risk, where the color indication is indicative of the risk level. For example, red could indicate a high risk level, green could indicate a low risk level, and yellow could indicate a moderate risk level. The scoring for an identified risk can also be made to programmatically prompt escalation of the identified issue by displaying an escalation flag.

Embodiments of the invention are implemented via either a stand-alone instruction execution platform in a workstation or such a platform interconnected with a workstation for gathering input, a database server and/or other platforms by a network, such as a corporate intranet, a local area network, or the Internet. A computer program product or computer program products contain computer programs with various instructions that execute or are executed and cause the hardware to carry out, at least in part, the methods and processes of embodiments of the invention. The database server typically stores risk levels, RPN scores, mitigation plans, metrics and calculated figures, all on a storage medium. Dedicated software can be provided to implement all or parts of an embodiment of the invention, or alternatively, a web server and web browser can be used for input and output.

BRIEF DESCRIPTION OF THE DRAWINGS

FIG. 2 is a flowchart illustrating a portion of the detail of the process of FIG. 1 according to at least some embodiments of the present invention. FIG. 2 is shown split across two sheets as FIG. 2A and FIG. 2B for clarity.

FIG. 4 is a screen shot of a portion of an example input screen according to example embodiments of the present invention. FIG. 4 is shown split across two sheets as FIG. 4A and FIG. 4B for clarity.

DETAILED DESCRIPTION

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical, semiconductor, or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to flowchart illustrations and/or block diagrams of methods, apparatus (systems) and computer program products according to embodiments of the invention. It will be understood that the blocks of the flowchart illustrations representing elements, processes or sub-processes than can occur in any order or simultaneously, unless specifically stated otherwise, or the nature of the processes referred to dictates otherwise. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executable and execute via the processor of the computer or other programmable data processing apparatus or platform, create means for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention are disclosed, by way of example, as a tool used in a financial institution to determine risk in connection with financial services projects directed to changes in the way the enterprise conducts business. It cannot be overemphasized that this environment is illustrated as an example only, and an embodiment of the invention can be used in any kind of business, non-profit organization, or government organization. With respect to the example of a bank or financial institution, the term "bank" or the synonymous term "financial institution" and any similar terms are used herein in their broadest sense. Financial institutions that process transactions and documents of the types discussed can include stock brokerages, credit unions, and other types of institutions which are not strictly banks in the historical sense. The term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

Embodiments of the method of the invention may be referred to herein as a "change risk assessment" or a "universal change risk assessment" (UCRA) and a system used to implement an embodiment of the invention may be referred to herein as a change risk assessment system or UCRA system. The UCRA in example embodiments of the invention uses a question-and-answer approach to generate a robust risk assessment. When used by a financial institution it can provide a vehicle to address the requirements of government financial regulations, such as, in the United States, OCC Bulletin 2004-20. The UCRA as used by a financial institution can address many types of business risk associated with financial services: credit, market, and operational, which is further broken out in this example into strategic, customer experience, reputation, legal, compliance, financial, people, process/execution, systems/technology, and external factors/outside entity risk. The UCRA can quantify inherent risk (risk before mitigation plans or controls are taken into account) and residual risk (risk after mitigation plans or controls are taken into account) within a given change, and can provide a risk level based on a high/medium/low scale. A color indication of the risk level can be provided on-screen, for example, red for a high risk level, yellow for a medium risk level, and green for a low risk level.

Example embodiments of the UCRA can enable relative comparison of risks within an initiative based on risk score, and relative comparison of risks across many initiatives based on average risk scores. In example embodiments, the UCRA uses a scoring scale of 1-5 to rate each of the severity of each risk, its probability of occurrence, and the ability to detect the occurrence, and the three scores are multiplied to obtain a risk priority number (RPN). Embodiments of the UCRA use both RPN values and additional Boolean computations to take into account and reflect the unique risk associated with a question for which the risk exhibits both high severity and low detectability characteristics.

An example system implementing an embodiment of the invention can provide escalation criteria and an escalation path when risks exceed threshold tolerances that can be programmatically set for specific questions and/or categories of risk. An indicator or so-called "escalation flag" can be displayed to indicate that escalation is warranted. The UCRA system calculates automatically whether a change project is high risk based on empirical data gathered and the risk levels determined for the questions. A high-risk analysis is prompted if the project is high-risk. In example embodiments, a high-risk analysis includes performing two additional assessments during the life cycle of the project.

In example embodiments, the UCRA system provides the additional ability to collect information on risk mitigation plans, the owners of the plans, and potential key performance indicators that could be used to measure the effectiveness of the mitigation plans. The system can also document the approval of the risk assessment, when it was approved, and the approval decision. In example embodiments, the approval decision includes dispositions of: approved; approved with contingencies; and declined. An approval can be recorded as being handled by a committee or handled by individuals. Names, contact information, and the like can be documents and stored for either individual approvers or committee members. Management reports can be provided and forwarded electronically, for example, via Email.

In example embodiments, UCRA can programmatically require a control plan for every change to measure, track, and report performance of the change against goals, and to establish accountability and an escalation process for variation in performance to those goals. Post-control monitoring can also be programmatically required. With post-control monitoring, the documentation of actual results and comparison to control plan goals can be established and the results of the comparison can be included in the database and included in reports.

In example embodiments, the UCRA system is set up with access to the Email and directory servers of the enterprise so that Emails can be sent automatically to notify the person responsible for the risk assessment that a UCRA has been set up and assigned. Data can then be gathered online so that all risk assessments are accounted for. Data can be housed in a database on a database server, such as an SQL server. A dashboard display can provide at-a-glance information on average risk score and a color indication of risk level by type of risk. In this financial services example, risks can be categorized as credit, market, strategic, customer experience, reputation, legal, compliance, financial, people, process/execution, systems/technology, external factor/outside entity, and other risks not identified elsewhere. As mentioned elsewhere herein, in some embodiments the latter twelve of the categories listed above can form a single "operational risk" category.

Figure 1:
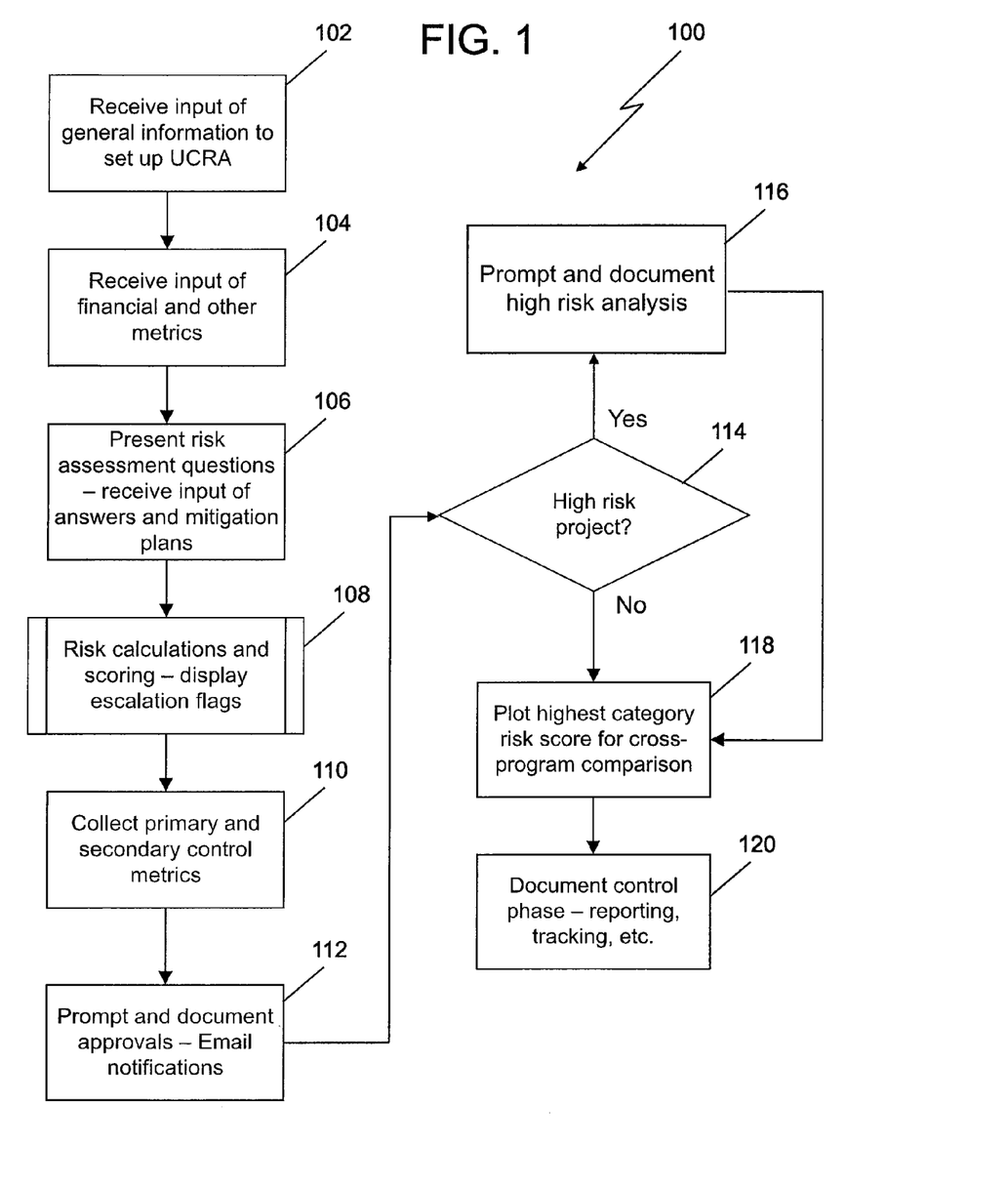
FIG. 1 is a flowchart illustrating the overall process of at least one example embodiment of the present invention.

FIG. 1 is a flowchart illustrating an overall process for the UCRA according to example embodiments of the invention. Like most flowchart illustrations, FIG. 1 illustrates process 100 as a series of process or sub-process blocks. At block 102, input is received to set up a new UCRA in the system. This input includes general information such as the change or project, its title, who is submitting it, what the change objective is, etc. In some embodiments, fields on the input screen have drop-down menus for selection or have a "hover-over" explanation for what should be entered. Required fields can be highlighted, such as with an asterisk. At block 104, information on various metrics, including financial metrics, is received via user input. These financial metrics can include NIBT (net income before tax) and three-year NPV of SVA (net present value of shareholder value add). In this example embodiment, information on a profit and loss business case can also be collected if such a business case exists. In some embodiments, if no financial data supports the change, other data can be entered. A primary metric will typically be selected as the performance indicator one would want to positively affect as a result of the change. A secondary metric would typically be selected as the performance indicator one does not want to negatively affect as a result of the change.

Still referring to FIG. 1, the actual risk assessment question section of the UCRA is presented at block 106. Risk evaluation and mitigation plan input is received. Typically, a user would complete the risk assessment with input from all affected partners (risk and compliance, legal, finance, etc.). Questions in the various categories of risk can be selected via tabs in the user interface, as will be described later with reference to FIG. 4. A user rates the inherent or pre-mitigation risk for severity (S), probability of occurrence (P) and ability to detect (D). In this example embodiment, these factors are rated on a 1-5 scale. A user enters the mitigation plan, which should explain the controls that will be put in place to reduce the effects of the risk and should address short-term/immediate plan and ongoing, business as usual plan. The user would then rate the risk again, taking into account the effects of the mitigation plan.

In example embodiments, the 1-5 ratings for each attribute of the risk might be described more specifically to guide the user, for example, via a help button or rating scale button in the user interface. The rating scale for severity might break down as shown below.

1—Risk has potential for insignificant effect on customers, associates (employees), or shareholder or no external exposure;

2—Risk has potential for minor defects to be noted by some customers or minor associate negative impact/dissatisfaction or minor impact on earnings/capital or negligible media exposure;

3—Risk has potential to be noticeable to customers resulting in potential for lost business or noticeable associate impact resulting in potential for dissatisfaction or capacity issues, or moderate impact on earnings/capital or negative local media coverage;

4—Risk has potential for considerable negative customer impact and lost business or considerable associate impact (dissatisfaction or capacity issues) or more than moderate impact on earnings/capital or negative regional/local media coverage;

5—Risk has potential for almost certain loss of customers or significant associate impact (dissatisfaction or capacity issues) or material impact on earnings/capital or negative national media coverage; repeated news mentions.

The rating scale for probability/likelihood of occurrence might break down as follows:

1—Remote, failure or impact is unlikely; <1% chance;

2—Low, relatively few failures or impact would be relatively unlikely 1/100 (1%-2%) chance 3—Moderate, occasional failures, or impact would be likely; 1/50 (2%-5%) chance 4—High, repeated failures or impact would be very likely; 1/20 (5%-10%) chance 5—Very high, failure is almost inevitable; 1/10 (+/−10%) chance.

The rating scale for ability to detect might break down as follows:

1—Almost certain detection; detection method almost never fails and is almost certain to detect before impact;

2—High chance of detection; detection method has proven to be very effective to detect before impact;

3—Moderate chance of detection; detection method is in place but not sufficiently proven to detect before impact;

4—Very low chance of detection; detection method is unproven or unreliable to detect before impact;

5—Little or no chance of detection; there is no detection method in place to detect before impact.

Once all risks and mitigation plans have been entered, the UCRA system performs the necessary risk calculations and displays color indications, escalations flags, and the like at block 108. The calculations are detailed and describe below with reference to FIG. 2 and FIG. 3.

Staying with FIG. 1, primary and secondary control metrics are collected at block 110. These metrics, in example embodiments, can be included in a control plan summary that documents plans to maintain and monitor the performance of the change over time. These metrics can include current and target levels of performance. How data will be gathered, the frequency of reporting, and who will be responsible for it can also be specified for both high and low risk changes, along with the escalation process and responsibility if target levels are not met. At block 112, approvals can be prompted and documented. The UCRA can be interconnected with Email servers and directory systems to track approvals, send automated Emails, and keep track of personnel involved in the process. All of these various stages of a UCRA can be referenced via a system of user interface tabs. Other user interface constructs can of course be used.

Block 114 of FIG. 1 is a decision block where processing branches depending on whether the project has been determined to be a high-risk project according to the calculations performed at block 108. If so, high risk analysis is prompted at block 116. High-risk analysis in example embodiments includes ongoing UCRA risk assessments on a regular schedule. However, the system can be engineered to prompt any other type of analysis deemed to be appropriate for high-risk projects, including additional calculated scores, special approvals by specified personnel, etc. At block 118, the highest category average for the project can be plotted together with the highest category average for other projects on a grid display for cross-project comparison. This type of plot will be discussed in further detail below with reference to FIG. 5. At block 120 of FIG. 1, the system documents a control phase, which can include reporting, tracking and the like.

Figures 2, 2A:
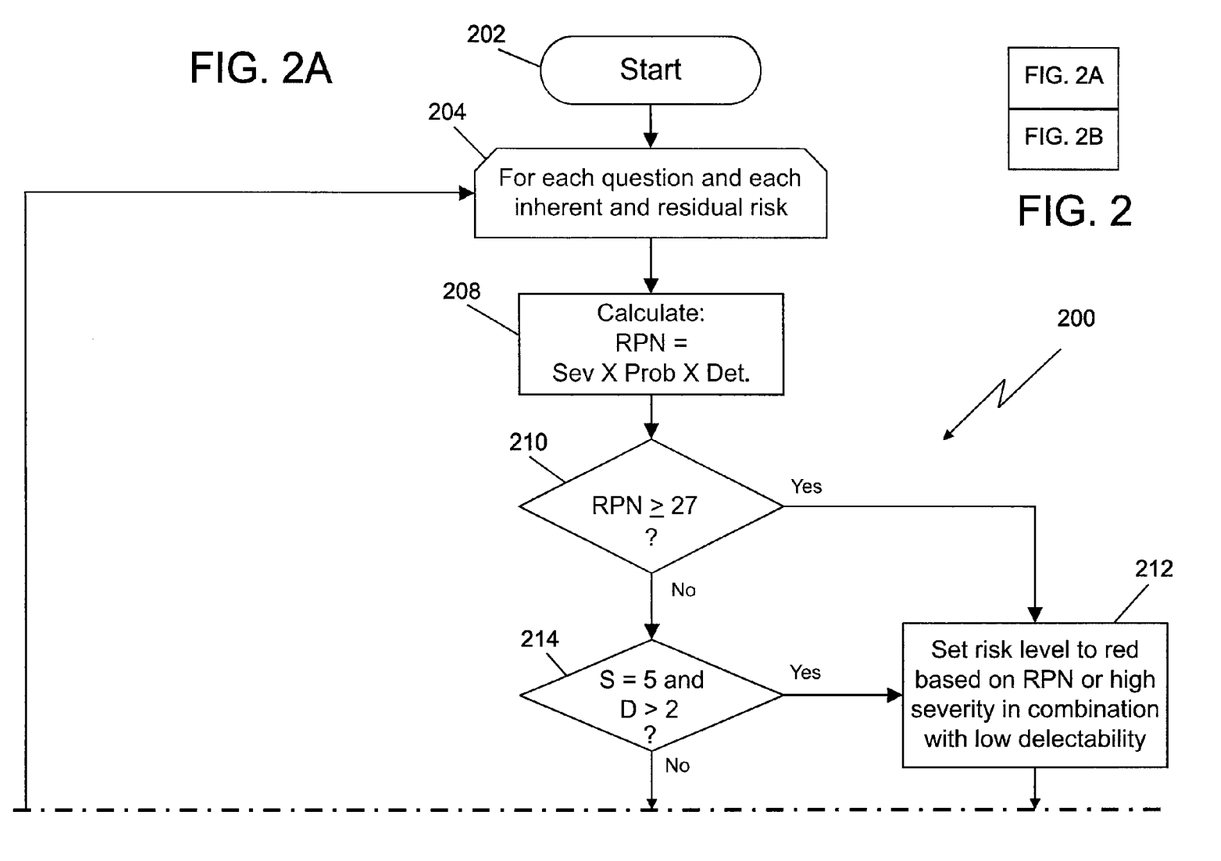
Figure 2B:
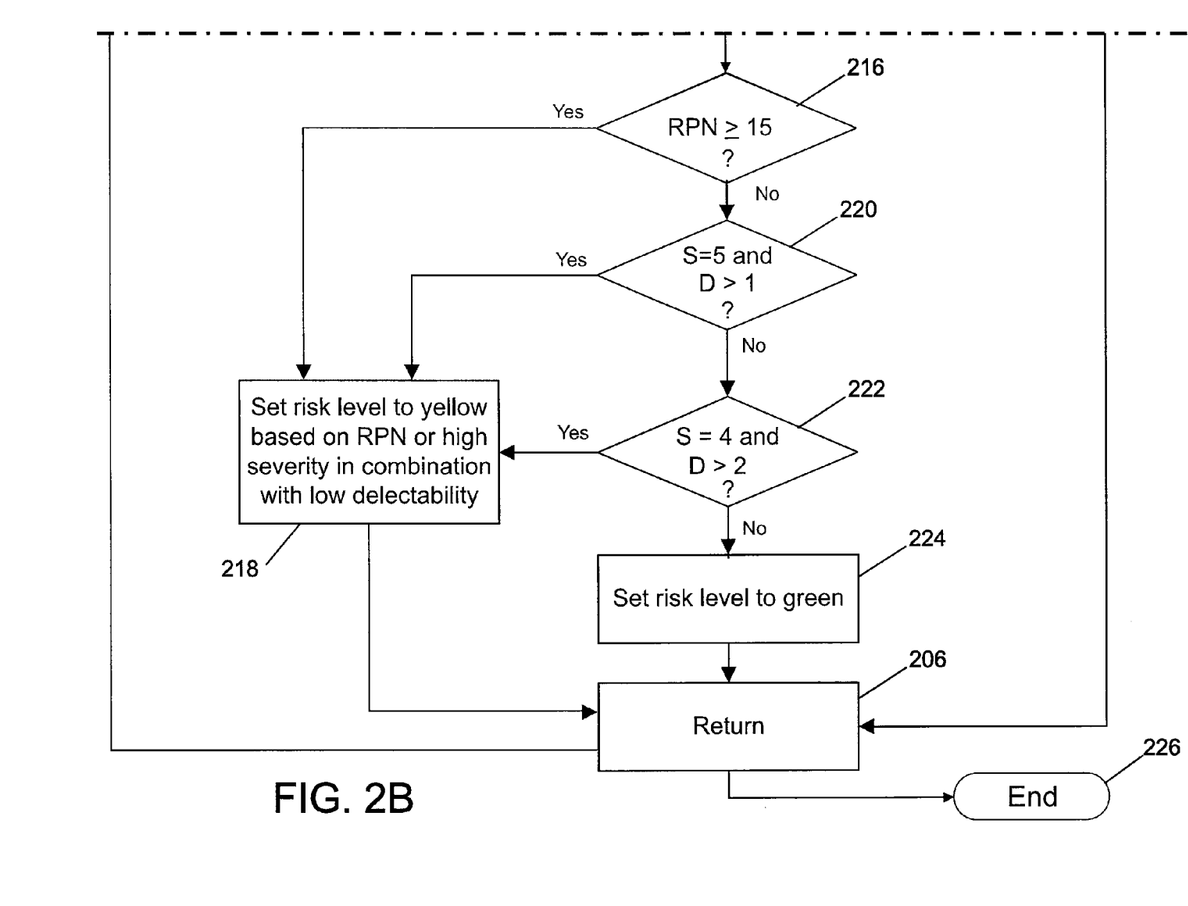
Figure 3:
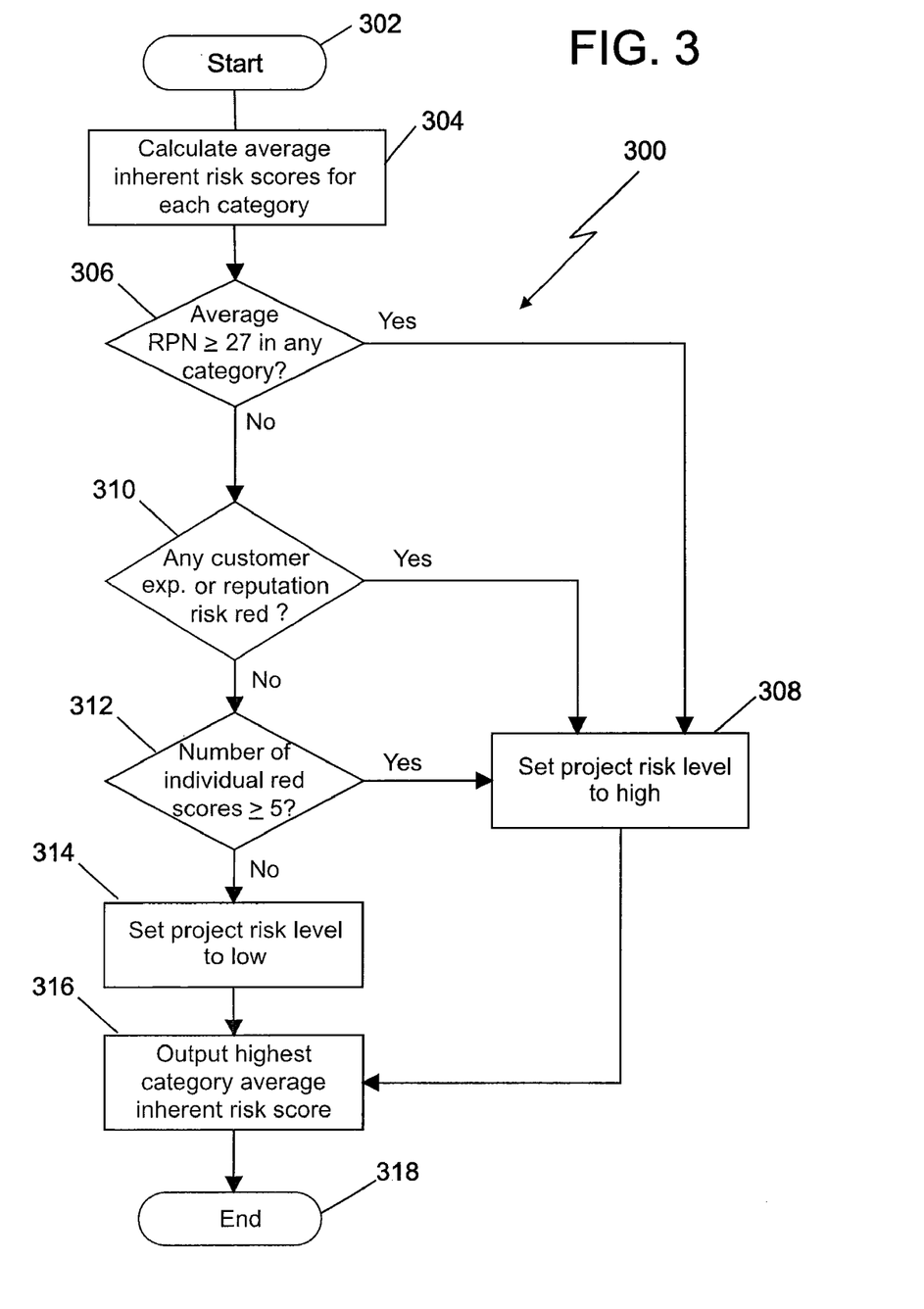
FIG. 3 is a flowchart illustrating another portion of the detail of the process of FIG. 1 according to at least some embodiments of the present invention.

FIG. 2 and FIG. 3 illustrate details of the calculation process shown at block 108 of FIG. 1. In particular, FIG. 2 illustrates the calculation of a risk level and a risk priority number (RPN) for each risk identified in the UCRA. FIG. 2 is shown split across two sheets as FIG. 2A and FIG. 2B for clarity. Process 200 of FIG. 2 begins at block 202. The process repeats for each risk for which ratings and a mitigation plan are input by the user, as indicated by loop limit block 204 and return block 206. For each inherent and residual risk, the RPN is calculated at block 208. In this example embodiment, the RPN is calculated by multiplying the severity by the probability of occurrence by the ability to detect at block 208. At block 210, a determination is made as to whether the RPN is greater than or equal to 27 based on the calculation done at block 208. If so, the risk level is set to its highest level, which in this embodiment, is denoted by an on-screen red color indication at block 212. However, in this example embodiment, the RPN is not simply accepted as the indicator of risk level. Rather, a determination is made as to whether the severity of the risk is equal to a level of 5, and the ability to detect is greater than a level of 2. If so, the risk level is again set to red at block 212. Thus, in example embodiments of the invention, the risk level assigned to an identified risk reflects cases where the risk implicated by the question exhibits a combination of high severity and low detectability in terms of the risk posed.

Still referring to FIG. 2, a determination is made at block 216 as to whether the RPN is greater than or equal to 15. If so, the risk level is set to an intermediate risk, with a color indication on screen of yellow, as shown at block 218. Again, the RPN alone is not necessarily relied on to provide a risk indication. At block 220, a determination is made as to whether the question is rated with a severity level of 5 and an ability to detect level of greater than 1. If so, the risk level is again set to yellow at block 218. Likewise, at block 222, a determination is made as to whether the posed risk exhibits a severity level of 4 and an ability to detect level of greater than 2. If so, the risk level is again set to the intermediate or yellow range at block 218. If none of the above intermediate or high risk criteria are met, the risk level is set to its lowest level, denoted by an on-screen indication of green, at block 224. Process 200 of FIG. 2 ends at block 226.

FIG. 3 illustrates a process, 300, of determining whether a project is a high risk project, as well as determining an inherent risk score for the project for purposes of cross project comparison. Process 300 of FIG. 3 begins at block 302. At block 304, the average inherent risk score for each category is calculated. In some embodiments, a simple average is calculated for all of the risk priority number scores for each question in a given category. In example embodiments, inherent risk is used, since it is not known at the present stage what the effect of the various mitigation plans will actually be. In some embodiments, other schemes can be used to calculate category risk scores, for example, risk scores in certain categories can take into account questions from other categories. Such a technique might be valuable for a customer experience category, since risks in many different categories could theoretically have an effect on customer experience.

At block 306 of FIG. 3, a determination is made as to whether the average RPN for any of the categories of credit, market or operational risk for the current project is greater than or equal to 27. If so, the project risk level is set to high at block 308. Otherwise, a determination is made at block 310 as to whether any customer experience or reputation risk identified with the current project is assigned the highest risk level, in this example, a risk level indicated by the color red. If so, the project risk level is again set to high at block 308. It should be noted that whether these specific risk categories are given special treatment is an engineering decision, and will vary depending on the type of enterprise, which is making use of an embodiment of the UCRA.

Still referring to FIG. 3, a determination is made at block 312 as to whether the number of individual red scores in the project is greater than or equal to 5. If so, the project risk level is again set to high at block 308. Again, the specific threshold number to use for the determination at block 312 can vary, and is subject to a determination by those setting up a UCRA for use in a particular business situation. At block 314, where none of the above tests have been met, the project risk level is set to low. At block 316, the highest category (credit, market, or operational) average inherent risk score is output as the project risk score, and the process ends at block 318.

It should be noted that categories can be defined differently in terms of what is used as a category average for determining an overall project risk score. A previously mentioned, in an embodiment of the UCRA for a financial services business, there are three main categories of risk; credit, market, and operational. Average scores from these three categories can be used. However, as previously noted, in this example, operational risk can be further broken down into additional categories of risk; strategic, customer experience, reputation, legal, compliance, financial, people, process/execution, systems/technology, and external factors/outside entity risk. In some embodiments of the UCRA, the system can be designed to use category averages for the credit and market categories together with category averages for each of the sub-categories of operational risk.

Figures 4, 4A:
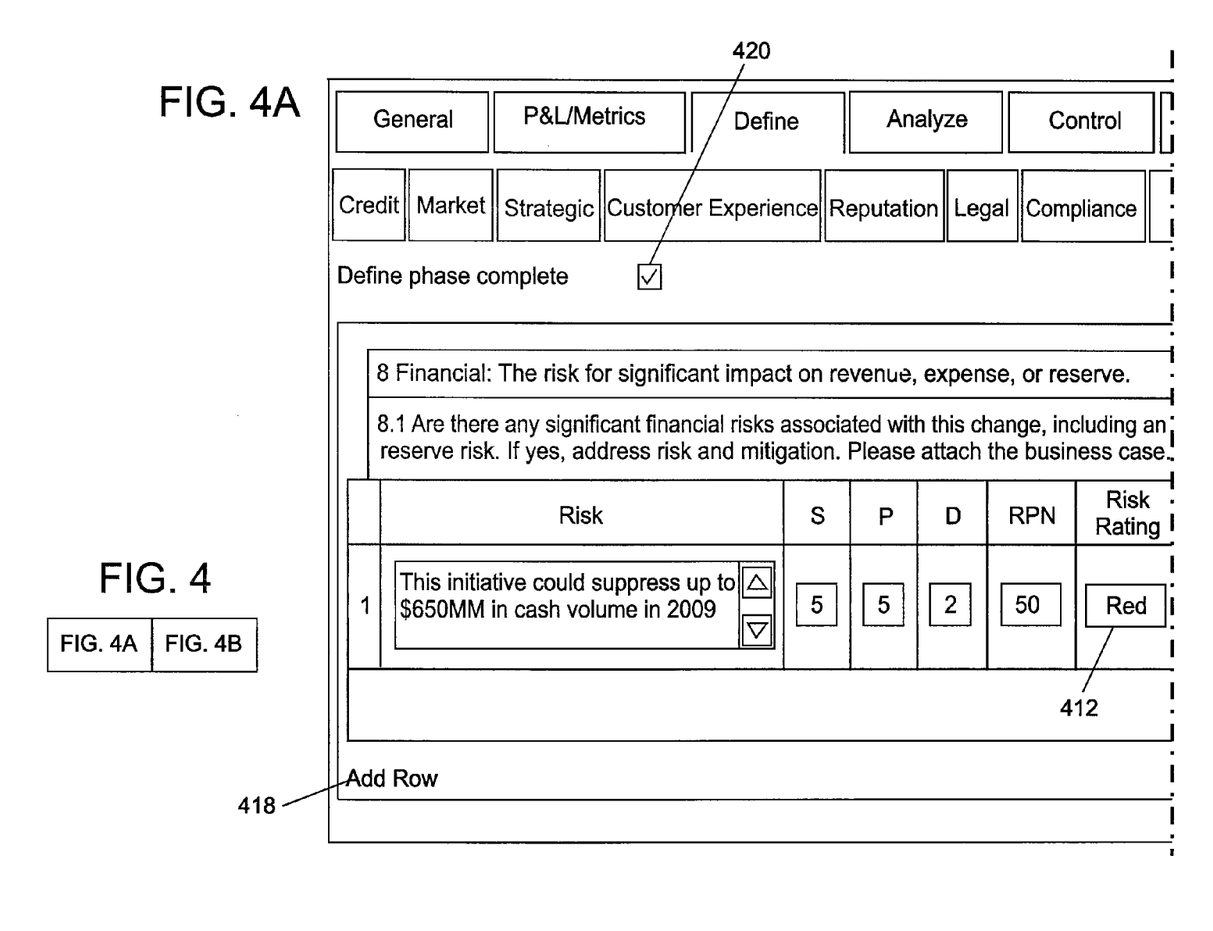
Figure 4B:
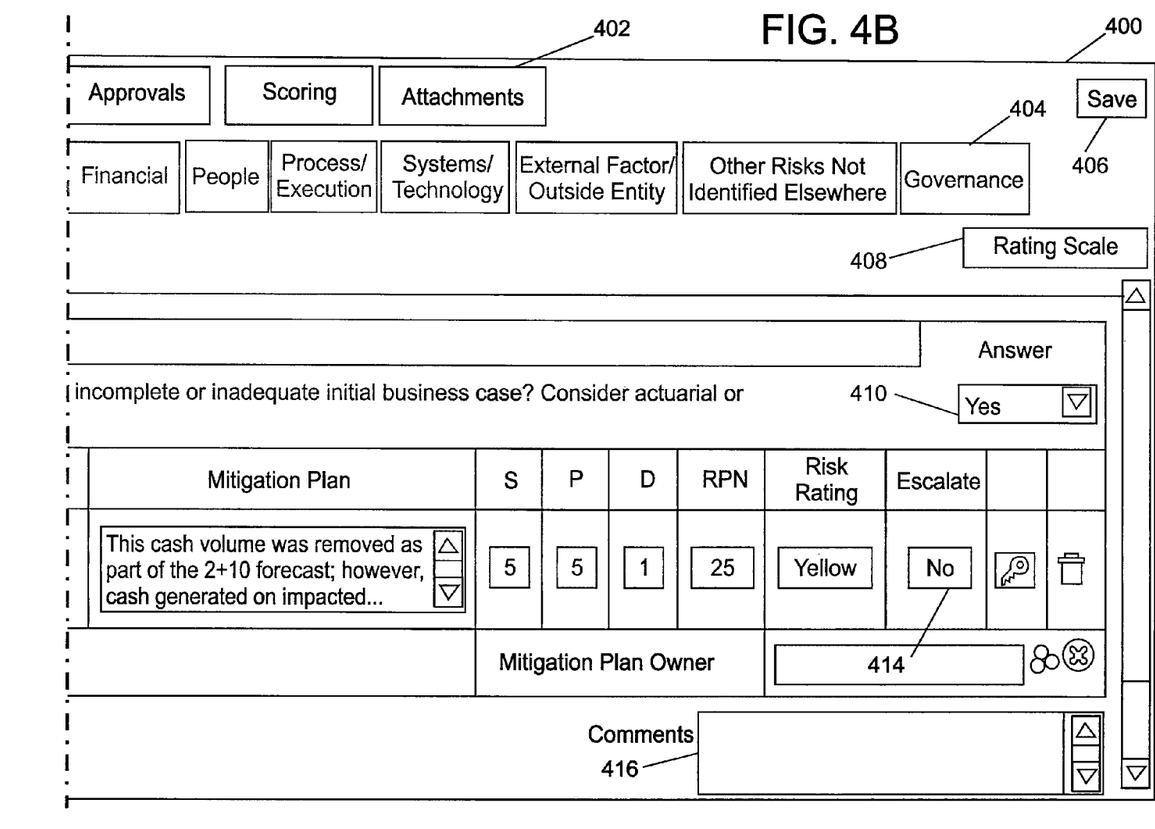

FIG. 4 is a screen shot of a portion of the user interface for a UCRA system according to example embodiments of the present invention. FIG. 4 is shown split across two sheets as FIG. 4A and FIG. 4B for clarity. Screen 400 of FIG. 4 includes a plurality of top most tabs 402, which corresponds to the various phases of the UCRA. The general tab is where information is input to set up the UCRA. The profit and loss metrics are where the various metrics by which the project is to be measured are entered. The example embodiment of the UCRA described herein uses a define measure analyze improve and control (DMAIC) philosophy. The questions that are answered for the risk assessment are presented in the define, analyze, and control phases of the UCRA, although they could just as easily be presented under one tab, or there could be tabs for every DMAIC phase. Top level tabs also exist for approvals, scoring and attachments. Another set of tabs, 404, is used to select the various categories of questions as previously described.

Still referring to FIG. 4, near the top of screen 400 there is also a save button, 406, and a button to display the rating scale for help, 408. The particular question in this example is related to financial risks. The question is answered with a yes in drop down box 410. The risk presented is that of suppressed cash volume. As can be observed, the three criteria are scored and input into the blocks after each question, a mitigation plan is input, and risk rating indicators are displayed. For example, in a color rendition of screen 400, indicator 412 would be red, and the similar indicator for the residual risk would be yellow. Screen 400 also includes escalation flags, which are generated by the UCRA system. For example, escalation flag 414 indicates that the risk addressed by this question does not require escalation. Screen 400 also includes the typical frame controls as well as buttons for deleting a question, indicated by a trash can icon, buttons for defining key performance indicators that may be used to measure the effectiveness of the mitigation plans, indicated by the key icon, and a box with user search and deletion controls in which a mitigation plan's owner can be named. A comment box, 416 is included. A link, 418, to add another row to identify another risk associated with this question is also included. Check box 420 is checked by the user when the particular phase, in this case the define phase, of the UCRA is complete.

Questions are placed in tabs associated with a given phase from among the various phases as appropriate for where the underlying business change initiative is in its project lifecycle. For example, questions in the define phase pertain to the inception of a change initiative, while questions in the analyze phase are more appropriate when additional details about the change initiative are known.

It can not be over emphasized that a UCRA system like that described here can be used in various types of enterprises and risk can be categorized in any manner necessary to apply an embodiment to a specific use. As previously mentioned, a category risk score may be computed by means other than taking a simple average of the scores of all the questions in the category. For example, in the financial services environment, it may make sense for the average for the customer experience risk score to not be a simple average of all risk scores for customer experience questions. Instead, because other questions within the assessment have customer experience impact, the risk related to these other questions might also be included in the customer experience average score so that the customer experience average score reflects the true overall customer experience risk posed by the project or change.

For example, other questions taken into account in determining customer experience risk might include questions related to impacts on associates, since those associates may work in customer contact areas. Such impacts might include negative impacts caused by increased or changed workloads. Questions about employee training and communication might also be taken into account for similar reasons. Process and execution questions may also be taken into account since process and execution can affect fulfillment, sales and servicing processes.

Figure 5:
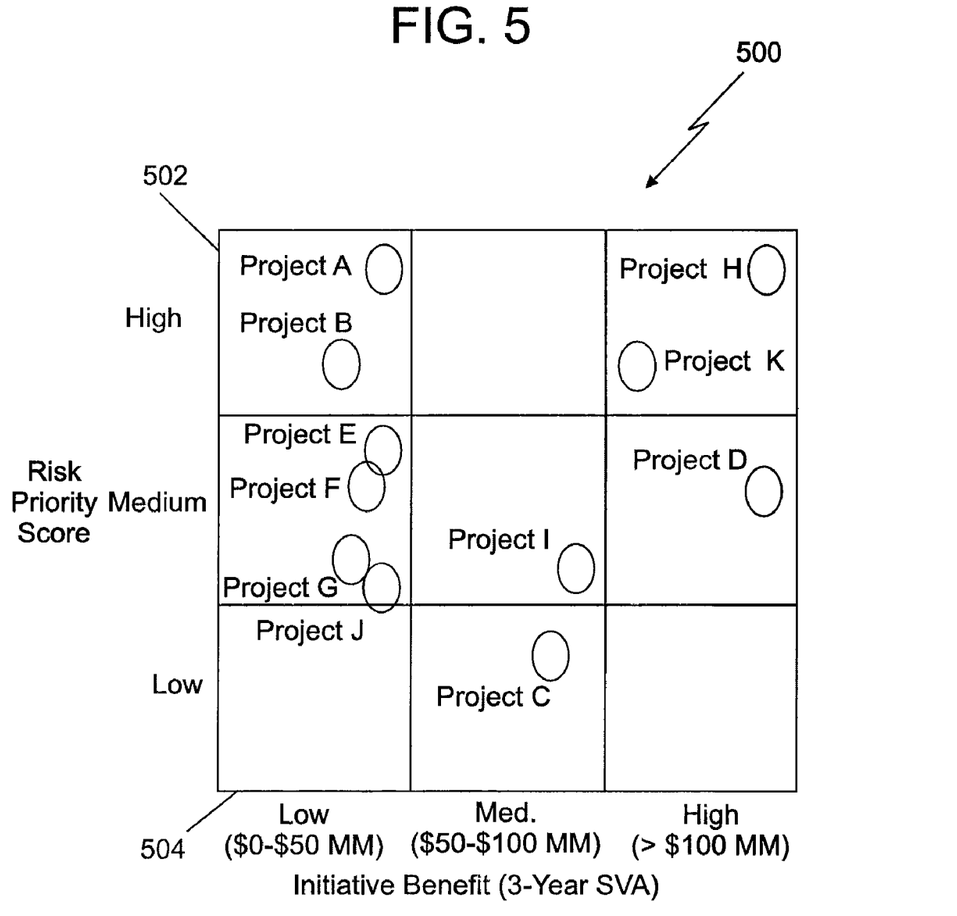
FIG. 5 is a screen shot showing how project risk scores can be plotted against a financial metric to facilitate cross-project comparison of risk versus reward.

FIG. 5 illustrates a display grid 500, which may be used to display a plot of an overall project risk score to facilitate cross project comparison of risk and reward balance. Risk priority number is shown on the vertical axis 502. A financial metric representing reward can be shown on the horizontal axis 504. In this particular example, the financial metric is reward measured by 3-year net present value (NPV) of shareholder value add (SVA). The scale for this horizontal axis can be adjusted as needed, but in the present example, the low end of the scale is an NPV of SVA of less than $50 mM, and the high end of this scale is an NPV of SVA of greater than $100 mM. Risk is measured by highest average RPN from the latest UCRA for the project. As previously mentioned, a project risk score in this example embodiment is an average of a plurality of question risk scores from a category. The same grid or matrix can be used to look at all the projects in a portfolio to compare the risk and reward associated with various projects to aid in project prioritization. The determined project risk score is plotted on the grid for display with all of the other project risk scores. In the example of FIG. 5, projects are designated by letters of the alphabet, project A through project K.

Figure 6:
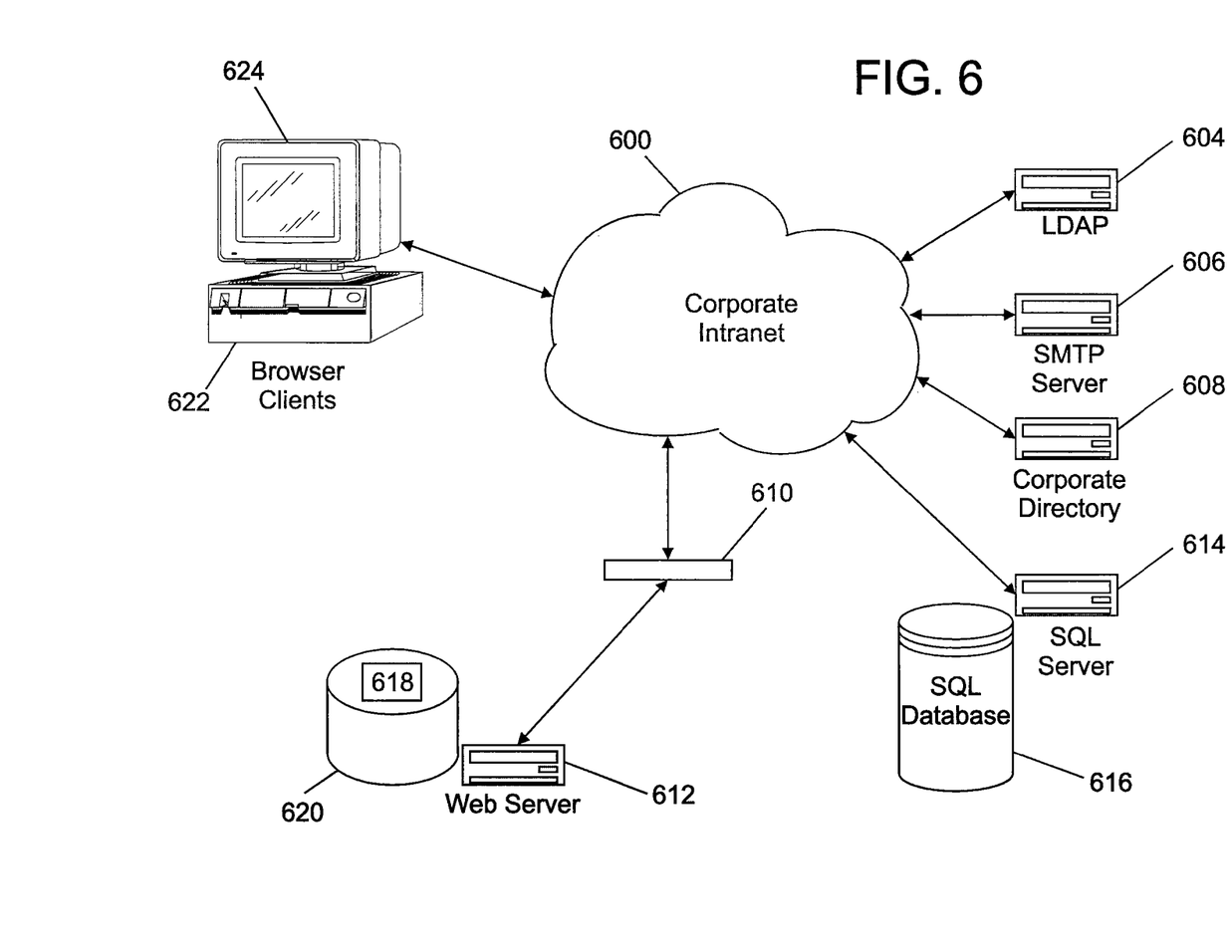
FIG. 6 is a system block diagram of an example system of an embodiment of the present invention.

FIG. 6 illustrates a larger network infrastructure that can be used to implement example embodiments of the invention, for example, in a large corporate enterprise having a web-enabled corporate intranet, 600. A lightweight directory access protocol (LDAP) server 604 provides authentication when a user logs onto the UCRA and other network resources, as is known in the art. Simple mail transfer protocol (SMTP) server 606 is used to generate outgoing notification E-mail messages at key stages of each process. A corporate directory server, 608, provides access to the company's master directory of associates (employees) and other information necessary when identifying/selecting personnel to use the UCRA system. An internet protocol (IP) switch, 610, directs traffic to and from a web server, 612. In this example embodiment, the SQL database server 614 stores scoring information, answers to questions, mitigation plans, approval status, and can store any and all other information maintained as part of the UCRA. The database is recorded on a storage device with a fixed storage medium, 616, which is associated with or included within database server 614. Web server 612 includes the UCRA application 618 residing on storage device 620. Again, storage device 620 may include a fixed storage medium. Computer program code instructions used to implement an embodiment of the invention can also be stored on portable or removable storage media. The application is presented to remote clients in this embodiment via a web interface. Browser client 622 resides at a workstation such as a personal computer. The workstation can include a display device, 624, which is typically a computer monitor as is known in the art.

In example embodiment, the UCRA system generates Emails for notification purposes via its interconnection with the SMTP server as shown in FIG. 6 and described above. These Emails can include Emails to a risk partner, individual approvers, committee members and the submitter of the UCRA. Emails to the submitter might include notifications of various approvals. Emails may also be automatically sent any of the above as reminders to take an action. A risk partner is a subject matter expert for a particular category of risk.

It should be noted that although an embodiment of the UCRA system can be implemented with a client-server architecture as described above with reference to FIG. 6, the UCRA could also be implemented as a stand-alone tool on an individual workstation. In such a case, all software and databases would reside on storage media in or at the workstation. In either case, the computer system actually doing the calculations and aggregating data includes an instruction execution platform which further includes a processor, memory, and supporting circuitry and can execute the appropriate instructions to manipulate data, store information, do calculations, and display appropriate screens for the user interface.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less"

can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of determining a level of risk in undertaking a financial services project to implement a change, the method comprising:
receiving, at a computing device, a plurality of responses to questions, each question related to one of a plurality of risk categories associated with the financial services project;
identifying, by a computing device processor, one or more inherent risks associated with a corresponding risk category based on the responses to the questions and a mitigation plan for each identified risk;
receiving, at a computing device, numeric risk ratings for each of the identified inherent risks, wherein the risk ratings include severity of risk, probability of risk occurrence and ability to detect risk;
receiving, at a computing device, a mitigation plan for each identified inherent risk;
identifying, by a computing device processor, one or more residual risks associated with a corresponding risk category based on the mitigation plan for each identified inherent risk;
receiving, at a computing device, numeric risk ratings for each of the identified residual risks, wherein the risk rating incorporates the risk rating for each identified inherent risk and the mitigation plan;
determining, by a computing device processor, a risk priority number (RPN) for each of the identified inherent and residual risks based on the numeric risk ratings;
calculating, by a computing device processor, a risk level for each identified inherent and residual risk based at least in part on the RPN, wherein the risk level reflects whether the identified risk exhibits a combination of high severity and low detectability;
aggregating, by a computing device processor, each risk priority number (RPN) associated with an inherent risk related to a risk category and calculating an average inherent RPN for each of the plurality of risk categories;
comparing, by a computing device processor, a highest average inherent RPN for the project to highest average inherent RPNs of other projects to facilitate cross-project comparison of risk and reward balance; and
displaying, on a display device, an escalation flag for each identified inherent and residual risk.

2. The method of claim 1 further comprising:
receiving, at the computing device, a financial metric for the project; and
displaying, on the display device, the highest average inherent RPN for the project against the financial metric to facilitate the cross-project comparison of risk and reward balance.

3. The method of claim 2 further comprising:
determining, by a computing device processor, whether the project is a high-risk project based at least in part on the risk level; and
prompting a high-risk analysis when the project is a high-risk project.

4. The method of claim 2 further comprising displaying a color indication for each identified inherent and residual risk on a display device, wherein the color indication is indicative of the risk level.

5. A computer program product comprising non-transitory computer-readable program code embodied on a computer-readable storage medium, the computer-readable program code executable by a computer system to implement a method of determining a level of risk in undertaking a financial services project to implement a change, the method comprising:
receiving, at a computing device, a plurality of responses to questions, each question related to one of a plurality of risk categories associated with the project;
identifying, by a computing device processor, one or more inherent risks and associated with a corresponding risk category based on the responses to the questions;
receiving, at a computing device, numeric risk ratings for each of the identified inherent risks, wherein the risk ratings include severity of risk, probability of risk occurrence and ability to detect risk;
receiving, at a computing device processor, a mitigation plan for each identified inherent risk;
identifying, by a computing device processor, one or more residual risks associated with a corresponding risk category based on the mitigation plan for each identified inherent risk;
receiving, at a computing device, numeric risk ratings for each of the identified residual risks, wherein the risk rating incorporates the risk rating for each identified inherent risk and the mitigation plan;
determining, by a computing device processor, a risk priority number (RPN) for each of the identified inherent and residual risks based on the numeric risk ratings;
calculating, by a computing device processor, a risk level for each identified inherent and residual risk based on the RPN and the mitigation plan, wherein the risk level reflects whether the identified risk exhibits a combination of high severity and low detectability;
aggregating, by a computing device processor, each risk priority number (RPN) associated with an inherent risk related to a risk category and calculating an average inherent RPN for each of the plurality of risk categories;
comparing, by a computing device processor, a highest average inherent RPN for the project to highest average inherent RPNs of other projects to facilitate cross-project comparison of risk and reward balance; and
displaying an escalation flag for each identified inherent and residual risk.

6. The computer program product of claim 5 wherein the method further comprises:
receiving a financial metric for the project; and
displaying the highest average inherent RPN for the project against the financial metric to facilitate the cross-project comparison of risk and reward balance.

7. The computer program product of claim 6 wherein the method further comprises:
determining whether the project is a high-risk project based at least in part on the risk level; and
prompting a high-risk analysis when the project is a high-risk project.

8. The computer program product of claim 6 wherein the method further comprises displaying a color indication for each identified inherent and residual risk wherein the color indication is indicative of the risk level.

9. A system for determining a level of risk in undertaking a financial services project to implement a change, the system comprising:

a computing device operable to (1) receive a plurality of responses to questions related to one of a plurality of risk categories associated with the project, (2) receive numeric risk ratings for each inherent risk identified by the responses to the questions, wherein the risk ratings include severity of risk, probability of risk occurrence and ability to detect risk, (3) receive a mitigation plan for each identified inherent risk and (4) receive numeric risk ratings for each residual risk identified based on the mitigation plan for each identified inherent risk, wherein the risk ratings for each residual risk incorporates the risk rating for each identified inherent risk and the mitigation plan and (5) display an escalation flag for each identified inherent and residual risk;

an instruction execution platform enabled by executable computer program code to determine a risk priority number (RPN) for each of the identified inherent and residual risks based on the numeric risk ratings, calculate a risk level for each identified inherent and residual risk based at least in part on the RPN, the risk level reflecting whether the identified risk exhibits a combination of high severity and low detectability, aggregate each risk priority number associated with an inherent risk related to a risk category calculate an average inherent risk priority number (RPN) for each of the plurality of risk categories and compare a highest average inherent RPN for the project to highest average inherent RPNs of other projects to facilitate cross-project comparison of risk and reward balance;

an instruction execution platform enabled by executable computer program code to receive and store, in a storage device, approval status of the risk level;

a storage medium comprising a database for storing answers to the questions and the highest average inherent RPN; and     a network interconnecting the instruction execution platform and the storage medium.

10. The system of claim 9 wherein the computing device is connected to the instruction execution platform by the network.

11. The system of claim 10 wherein the database is an SQL database and the plurality of responses are collected using a web browser.

12. The system of claim 11 wherein the computing device is further operable to receive a financial metric for the project and display the highest average inherent RPN for the project against the financial metric to facilitate the cross-project comparison of risk and reward balance.

13. The system of claim 12 wherein the computing device is further operable to display a color indication for each identified inherent and residual risk wherein the color indication is indicative of the risk level.

\* \* \* \* \*